W. J. McIntosh,
Corn Harvester.
No. 14,673.  Patented April 15, 1856.
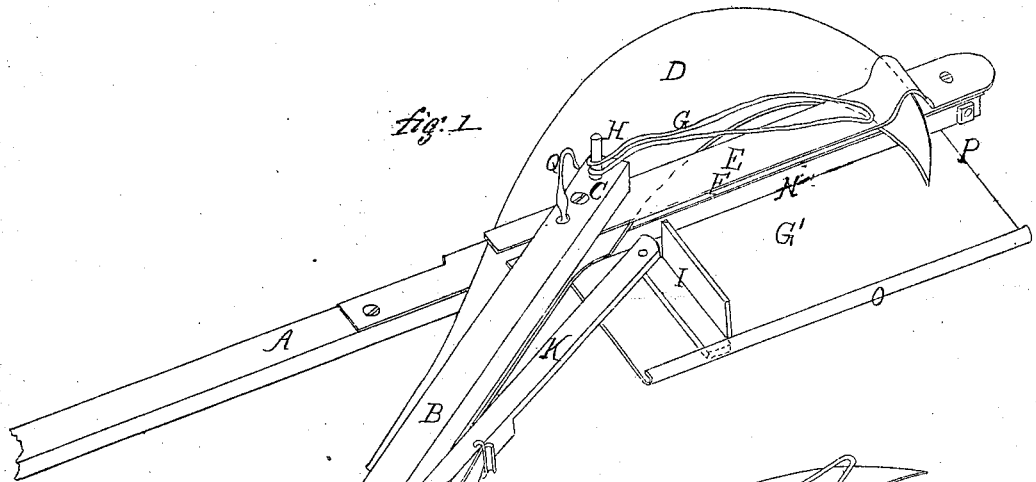
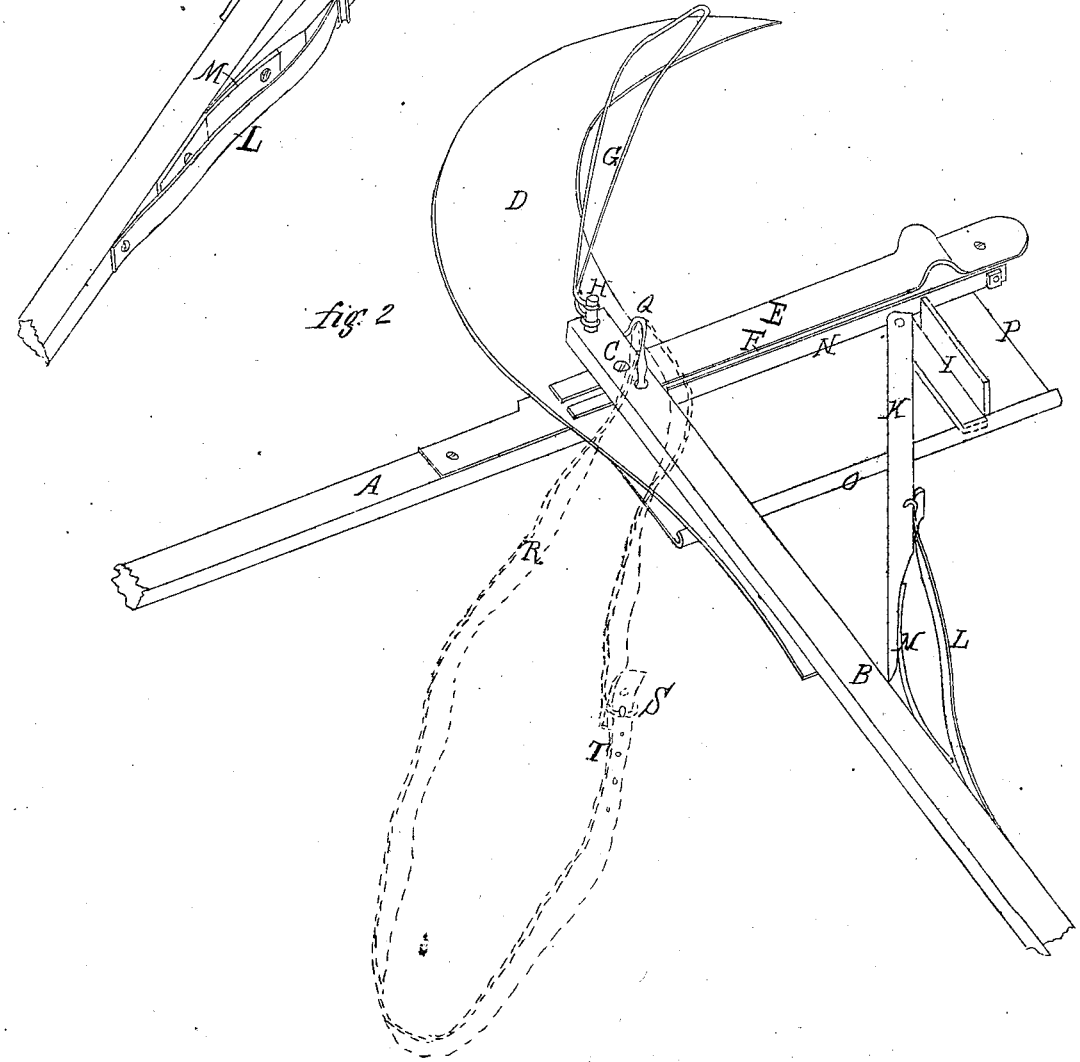

UNITED STATES PATENT OFFICE.

W. J. McINTOSH, OF SAVANNAH, GEORGIA.

IMPROVED IMPLEMENT FOR REAPING RICE.

Specification forming part of Letters Patent No. 14,673, dated April 15, 1856.

*To all whom it may concern:*

Be it known that I, W. J. McINTOSH, of Savannah, county of Chatham, State of Georgia, have invented an Instrument for Reaping Rice, of which the following is a full and exact description, reference being had to the accompanying drawing.

This machine consists of two arms, A B, connected together by a joint-pin at C, which pin serves as the fulcrum of their motions. The arm B terminate into a sickle-blade, D, working between two guide-plates, E F, the lower one of which plates, F, has a sharp edge, so as to operate upon the standing rice, in combination with the blade D, in a way similar to the action of shear-blades. The wire G, attached to the arm B at H, is arranged a little in front of the cutting-edge of the blade D, so as to bend the stalk over the edge of plate E toward a horizontal position preparatory to the performance of the cut. Thus the cut rice will be gently deposited upon a kind of cradle, G', attached to arm A in rear of the plates E F. A slider, I, provided with an arm, K, (which latter is hinged to arm B at M) and spring L, is guided between the sides N and O of the cradle, so as to traverse the length of the cradle backward and forward as the arms A B are alternately closed and opened. During the closing of the arms and the cutting of the rice consequent thereupon the slider travels backward, so as to leave the cradle clear for the reception of the cut rice. During the opening of the arms the slider pushes the cut rice along the cradle and over the front edge, P, of it for the purpose of depositing it on the stubble. A strap, R, is thrown over the shoulder or around the neck of the laborer and around a hook, Q, near the center of gravity and the fulcrum of the instrument, so that the whole weight of the instrument is born by said strap, and the hands of the laborer are free for the operation of the two arms of the instrument. By giving the arms a proper shape, bent or otherwise, and by means of buckle S and holes T on the strap, the instrument can be adjusted to cut the rice at any desired height above the ground, and the laborer can always remain in a natural, erect manner, instead of being obliged to assume the stooping position, so excessively fatiguing in the usual mode of cutting rice by means of sickle or hook.

The instrument above described is cheap and simple in its construction. By its use the rice can be cut much more rapidly and with much more ease than heretofore.

It will be understood from the above that the stalk, after being caught between the cutting-edges, can be bent down by properly inclining the instrument, so as to lay the rice on the stubble before performing the cut. Thus the rice will be less agitated or shaken, which is important at certain stages of its maturity.

What I claim, and desire to secure by Letters Patent of the United States, is—

The cutters D F, in combination with the wire G and the cradle and slider G' I, or their equivalents, for the purposes set forth.

W. J. McINTOSH.

Witnesses:
   M. C. GRITZNER,
   GEO. R. ADAMS,